US006258483B1

(12) United States Patent
Abe (10) Patent No.: US 6,258,483 B1
(45) Date of Patent: Jul. 10, 2001

(54) METHOD FOR MANUFACTURING POSITIVE POLE ACTIVE MATERIAL FOR ALKALINE SECONDARY BATTERY, PASTE NICKEL POLE, AND ALKALINE SECONDARY BATTERY AND METHOD FOR MANUFACTURING THEREOF

(75) Inventor: Hidetoshi Abe, Iwaki (JP)

(73) Assignee: The Furukawa Battery Co., Ltd., Yokohama (JP)

( * ) Notice: Subject to any disclaimer, the term of this patent is extended or adjusted under 35 U.S.C. 154(b) by 0 days.

(21) Appl. No.: 09/125,047

(22) PCT Filed: Feb. 12, 1998

(86) PCT No.: PCT/JP98/00549

§ 371 Date: Jun. 30, 1999

§ 102(e) Date: Jun. 30, 1999

(87) PCT Pub. No.: WO98/36463

PCT Pub. Date: Aug. 20, 1998

(30) Foreign Application Priority Data

Feb. 14, 1997 (JP) .................................................. 9-046998

(51) Int. Cl.[7] ....................................................... H01M 4/32
(52) U.S. Cl. .......................... 429/223; 429/206; 29/623.1
(58) Field of Search .................................... 429/206, 223; 423/594; 29/623.1

(56) References Cited

U.S. PATENT DOCUMENTS

| | | | |
|---|---|---|---|
| 5,281,494 | * | 1/1994 | Ettel et al. ............................. 429/223 |
| 5,629,111 | * | 5/1997 | Yamawaki et al. ................... 429/223 |
| 5,688,616 | * | 11/1997 | Yamawaki et al. ................... 429/223 |
| 5,691,086 | * | 11/1997 | Baba et al. ............................ 429/218 |

FOREIGN PATENT DOCUMENTS

| | | |
|---|---|---|
| 62-64062 | 3/1987 | (JP) . |
| 62-237667 | 10/1987 | (JP) . |
| 8-227712 | 9/1996 | (JP) . |

* cited by examiner

*Primary Examiner*—Carol Chaney
(74) *Attorney, Agent, or Firm*—Armstrong, Westerman, Hattori, McLeland & Naughton

(57) ABSTRACT

There is provided a method of producing an active material of a positive electrode used for an alkaline secondary battery which is difficult to be oxidized, and high in its reactivity with an alkaline electrolyte to form a cobalt electric conductive matrix improved in electric conductivity. The method of producing thereof is characterized in that nickel hydroxide powder is dispersed in an aqueous solution of a strongly acidic cobalt salt and the dispersed solution thereof is, while being stirred, added gradually with an aqueous alkali solution to made to react one with another to precipitate a cobalt hydroxide while maintaining the reaction solution in the region of acidity to neutrality, and a solid part in which the cobalt hydroxide is mixed in the nickel hydroxide is separated from the reaction solution which is in the region of acidity to neutrality after the completion of the reaction, and is then washed with water. By this method of producing, there is obtained an active material of a positive electrode used for an alkaline secondary battery in which the amorphous to microcrystal cobalt hydroxide is mixed in the nickel hydroxide. Thus, using this active material of the positive electrode, a paste-type nickel electrode improved in utilization rate is obtained, and using the nickel electrode, an alkaline storage battery which has a high capacity and is excellent in the battery characteristics such as discharging characteristics, etc. is obtained.

7 Claims, 2 Drawing Sheets

METHOD FOR MANUFACTURING POSITIVE POLE ACTIVE MATERIAL FOR ALKALINE SECONDARY BATTERY, PASTE NICKEL POLE, AND ALKALINE SECONDARY BATTERY AND METHOD FOR MANUFACTURING THEREOF

TECHNICAL FIELD

The present invention relates to a method of producing an active material of a positive electrode used for an alkaline secondary battery, a paste-type nickel electrode, an alkaline secondary battery and a method of producing thereof.

BACKGROUND ART

As for conventional active materials of positive electrodes used for alkaline secondary batteries such as nickel-cadmium secondary battery, nickel-hydrogen secondary battery, nickel-zinc secondary battery, nickel-iron secondary battery and others, there are known active materials of positive electrodes which are made by adding and mixing at least one kind of such cobalt compounds as metallic cobalt powder, cobalt hydroxide or cobalt monoxide etc. as an additive to increase electric conductivity and utilization rate of the active material, with nickel hydroxide powder which is an active material or a nickel hydroxide powder with any metallic element such as cobalt, zinc, etc. formed in the solid solution. This active material of the positive electrode is mixed and kneaded with an aqueous solution of a thickener such as carboxymethyl cellulose etc. to form a paste, and then the paste is filled in an alkaline-resistant porous current collecting substrate made of a foamed nickel or a felt-like nickel etc., and then is dried and pressed to produce a paste type nickel electrode. The paste-type nickel electrode used as the positive electrode is stacked with a negative electrode one upon another with a separator interposed therebetween to form a plate group. The plate group is put in a battery container and a given amount of alkaline electrolyte is poured therein. Thereafter, a cover is applied thereto and an alkaline secondary battery is produced.

The above-mentioned metallic cobalt or cobalt compound reacts with hydroxide ions in the electrolyte and water soluble cobalt complex ions are formed and diffused, and are oxidized by charging of the battery, so that the conductive cobalt oxyhydroxide CoOOH for coating the surface of the nickel hydroxide is precipitated to form the so called electric conductive matrix network, so that electric conductivity of the active material of the paste-type nickel electrode, that is, between the nickel hydroxide particles is improved, and accordingly the intention of the improvement in utilization rate of the active material is achieved.

Further, as a prior art, JP-A 92-234867 discloses a method of producing an active material of a positive electrode. In the method, nickel hydroxide powder is immersed in an aqueous solution of metallic cobalt or cobalt salts such as cobalt sulfate, cobalt acetate, etc., added with sodium hydroxide to be made to react therewith in a weak alkaline region. Then, $\alpha$-Co(OH)$_2$ or $\beta$-Co(OH)$_2$ is precipitated, and there is obtained an active material for the nickel positive electrode in which the surface of the nickel hydroxide is coated with any of these cobalt compounds. A nickel electrode used for an alkaline battery is prepared by filling this material in a porous collecting substrate.

Furthermore, in JP-A 8-236108, there is disclosed a method of producing a nickel positive electrode in which a nickel hydroxide is produced. An aqueous solution of a cobalt salt and an aqueous solution of an alkali metallic hydroxide such as sodium hydroxide etc. are added to the slurry of nickel hydroxide and stirred to be made to react one with another while maintaining the alkaline condition of pH 11.5±0.3 to produce an active material in which a layer of cobalt hydroxide is formed on the surfaces of nickel hydroxide particles. A paste thereof is added and kneaded with such an additive as a metallic cobalt powder or the like to obtain an active material paste, which is filled in the porous substrate.

Furthermore, in JP-A 8-227712, it is disclosed that a solution of cobalt salt and an aqueous alkali solution are reacted in the alkaline region under the presence of a reducing agent such as hydrozine to precipitate cobalt hydroxide Co(OH)$_2$. At the same time, the oxidation reaction of cobalt hydroxide caused by dissolved oxygen in the reacting solution is inhibited due to the presence of the reducing agent. As a result, formation of an inactive higher-order cobalt oxide such as Co$_3$O$_4$ on the surface of Co(OH)$_2$ is prevented, and Co(OH)$_2$ powder which is obtained by being precipitated, is washed with water and dried, and Co(OH)$_2$ thus obtained is then added to nickel hydroxide and the paste-type active material thereof is filled in the porous electrode substrate to produce a nickel positive electrode.

After the paste-type nickel electrode filled with the mixture of the nickel hydroxide powder added with the powder of cobalt compounds such as cobalt monoxide or cobalt hydroxide etc. is incorporated in an alkaline battery, the cobalt compound is converted into cobalt oxyhydroxide in the paste-type nickel electrode by charging. This method of forming the electric conductive network has the following inconveniences. That is to say, since the cobalt compound itself, which is mixed among the nickel hydroxide particles, has no electric conductivity, the polarization at the initial charging is increased. It is feared a bad influence by generating gases, and accordingly there are involved such inconveniences that the charging has to be carried out with a small current. To ensure a rated charge capacity, a long charging time is required. Also in the case of metallic cobalt, it has such an inconvenience that because the surface thereof is oxidized to become a coat of cobalt oxide, it is unavoidable to require a long time for the initial charging as the cobalt oxide does.

Figure 1:
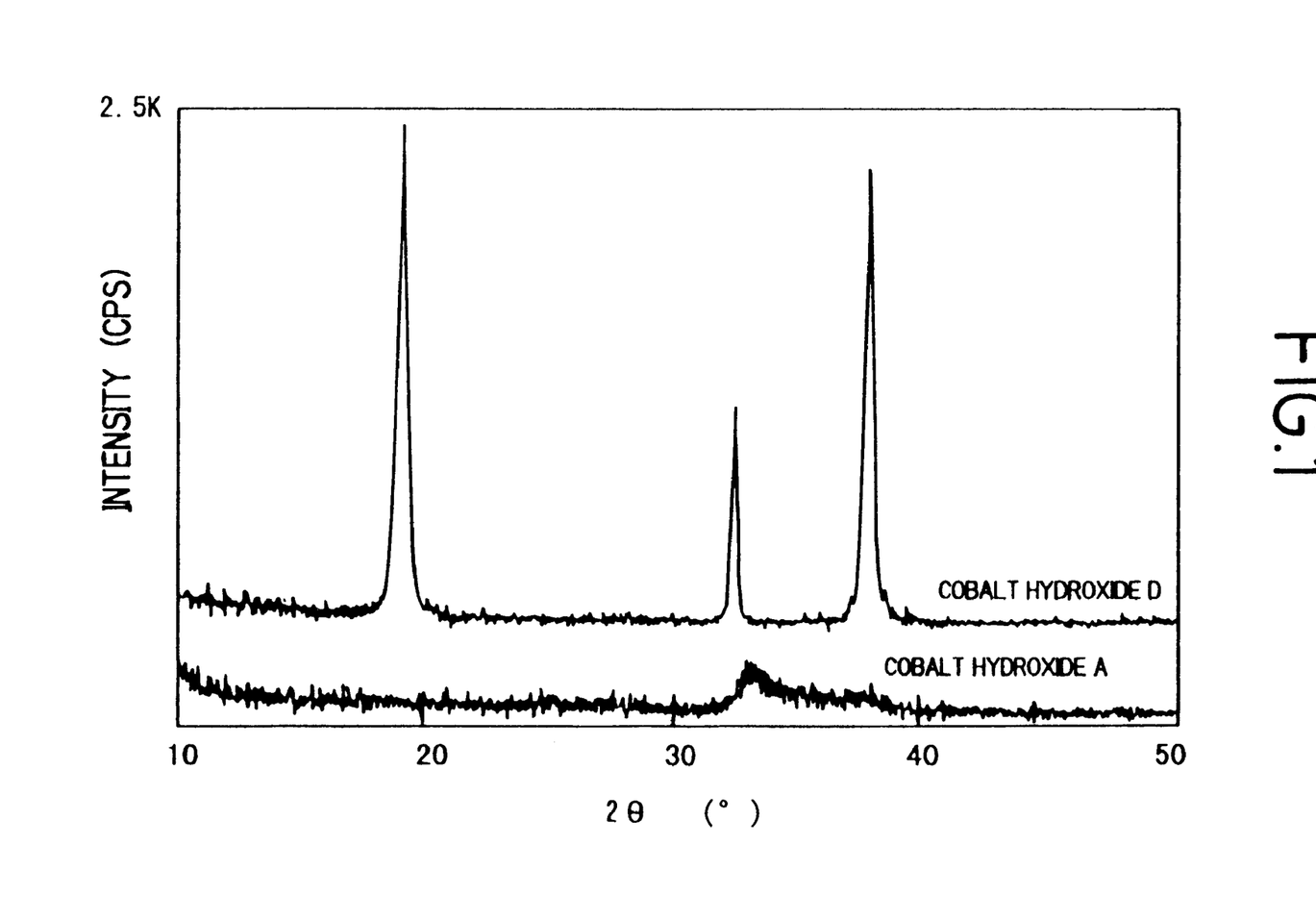
FIG. 1 is a comparison view showing X-ray diffraction patterns of the cobalt hydroxide obtained by the method of the present invention and of the cobalt hydroxide obtained by the conventional method.
Figure 2:
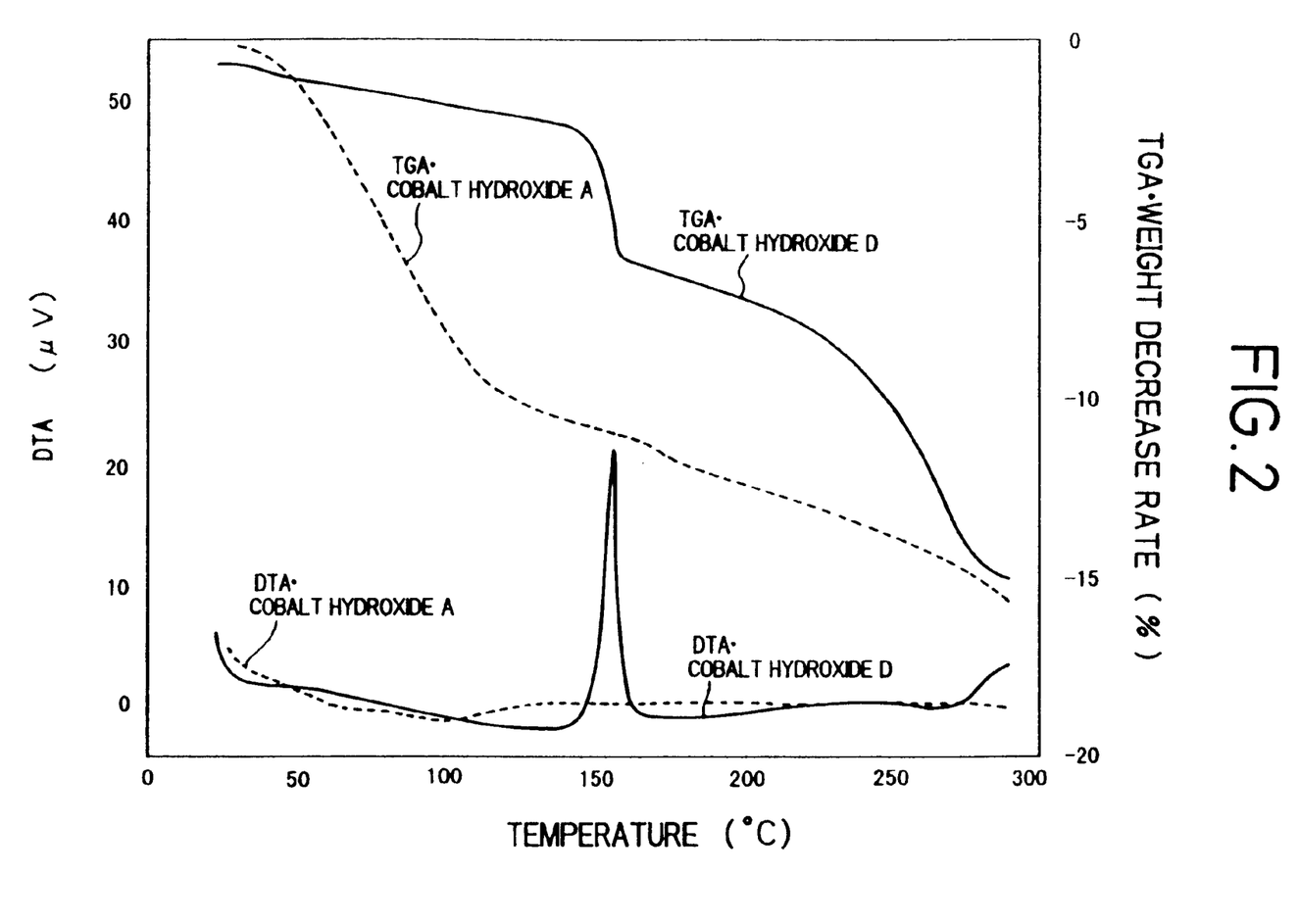
FIG. 2 is a comparison view showing patterns of a thermnogravimetric analysis TGA and a differential thermal analysis (DTA) of the cobalt hydroxide obtained by the method of the present invention and the cobalt hydroxide obtained by the conventional method.

As there is disclosed in JP-A62-234867, particles of cobalt hydroxide Co(OH)$_2$ precipitated by reacting the nickel hydroxide particles with cobalt salt and alkaline solution in an alkaline region of the reaction solution before filling an active material of nickel hydroxide in the porous collective substrate, are obtained as $\alpha$-Co(OH)$_2$ which is high in crystallizability, as it is clear from the X-ray diffraction patterns shown in FIG. 1 and FIG. 2, and therefore the surface area thereof is small, and accordingly reactivity thereof with alkaline electrolyte is low. Also $\beta$-Co(OH)$_2$ is easily oxidizable and the crystal grains thereof are easily turned into higher-order oxides such as inactive tricobalt tetroxide or the like with the lapse of time so that the electric conductivity thereof is lowered. Therefore, when the paste-type nickel electrode is produced by using the positive electrode active material prepared by mixing the particles thereof in cobalt hydroxide particles, there is caused such a problem that the utilization rate of the active material is lowered. Also the active material of a positive electrode has such an inconvenience that the oxidization thereof is progressed during preservation, and the preservation and control thereof become difficult.

Furthermore, a method of producing the active material of the positive electrode disclosed in JP-A 8-236108 is also such that the cobalt hydroxide is precipitated in an alkaline region. Accordingly the particles of cobalt hydroxide have the same high-crystallizability as the cobalt hydroxide in the invention disclosed in JP-A8-227712, so that it is easily oxidizable by contacting it with dissolved oxygen in the reaction solution or oxygen in the air, and easily becomes the inactive high-order oxides. Accordingly this involves such inconvenient problems that the utilization rate of the paste-type nickel electrode using this material is lowered and that the preservation and control of the positive active material thus produced become difficult.

Furthermore, according to the invention disclosed in JP-A 8-27712, in the case where the cobalt salt solution and the aqueous alkali solution are made to react one with another under the presence of the reducing agent, the oxidization of precipitated cobalt hydroxide caused by oxygen dissolved in the reacting solution can be avoided. However, if the reducing agent remains in the nickel hydroxide even by washing with water after completion of the reaction, it causes such problems as accelerating the self-discharge of the battery and the like. In addition, if washing with water is carried out completely and the reducing agent is removed completely, it is susceptible to be oxidized, and at the same time, inactive higher-order oxides are formed on the surface thereof and the electric conductivity of the electric conductive matrix is lowered.

Accordingly, it is desired to solve the above-mentioned conventional problems to produce cobalt hydroxide which is difficult to be oxidized and thereby to obtain such an active material for a positive electrode used for alkaline second batteries that is good in its reaction with an electrolyte and forms an electric conductive matrix which has a good electric conductivity in the paste-type nickel electrode.

DISCLOSURE OF INVENTION

The present invention lies in a method of producing an active material of a positive electrode used for an alkaline secondary battery characterized in that nickel hydroxide powder with or without any of metallic elements formed into a solid solution is dispersed in an aqueous solution of strongly acidic cobalt salt, and the diffused solution is added with an alkaline solution gradually while being stiffed so that the cobalt salt and the alkaline solution may be made to react one with another to precipitate cobalt hydroxide, and after the reaction is completed, an active material of a positive electrode which is a mixture of a mass of the cobalt hydroxide particles and a mass of the nickel hydroxide particles is separated from the reaction solution in the region of acidity to neutrality and is then washed with water.

Thus, according to the present invention, when such a reaction treatment is carried out that the alkaline solution is added to the dispersed solution prepared by dispersing the nickel hydroxide powder in the strongly acidic cobalt salt solution, and is made to react with cobalt sulfate, for instance, to precipitate cobalt hydroxide, cobalt hydroxide is precipitated in the region of acidity to neutrality of the reaction solution to stop a neutralization treatment, so that the cobalt hydroxide which is separated from the reaction solution which is in the region of acidity to neutrality is obtained as cobalt hydroxide which is amorphous to microcrystal. Accordingly the solid part separated from the resulting reaction solution can be obtained as an excellent active material of a positive electrode in which cobalt hydroxide is mixed in the nickel hydroxide as mentioned above.

Furthermore, this invention is to provide a paste-type nickel electrode which is improved in utilization rate of the active material of nickel hydroxide, and is characterized in that it is provided with an active material of a positive electrode made by mixing microcrystal or/and amorphous cobalt hydroxide in nickel hydroxide.

And, an alkaline secondary battery provided with this as the positive electrode can be obtained as an alkaline secondary battery which is improved in utilization rate of the active material of the nickel electrode, and accordingly has a high capacity and is excellent in battery characteristics such as a discharge characteristics as compared with the conventional alkaline secondary battery provided with the paste-type nickel electrode provided as the positive electrode with the active material for the positive electrode prepared by mixing the high crystalline cobalt hydroxide in the nickel hydroxide.

Furthermore, the present invention is to provide an alkaline secondary battery provided with the above-mentioned paste-type nickel electrode, and it is so constructed that using the above-mentioned paste-type nickel electrode of the present invention as a positive electrode, and a plate group formed by stacking it with a negative electrode one upon another with a separator interposed therebetween is put in a battery container, and a given amount of an alkaline electrolyte is poured therein and the opening of the battery container is applied with a cover and sealed. Thereby, a nickel paste-type sealed alkaline secondary battery with excellent battery characteristics is obtained.

Furthermore, the present invention is to provide a method of producing an alkaline secondary battery which is improved in the utilization rate of an active material and is improved in discharge characteristics, and it is characterized in that the foregoing alkaline secondary battery of the present invention is allowed to stand under temperature atmospheres of 20–800° C., and an initial charge is carried out. Thereby, there is obtained an alkaline secondary battery which is superior to the conventional alkaline secondary batteries.

Furthermore, the present invention is to provide a method of producing an alkaline secondary battery which is kept in a low internal pressure state in charging of the battery, and is excellent in the utilization rate of an active material, discharge characteristics and capacity recovering characteristics, and, it is characterized in that after the above-mentioned alkaline battery of the present invention is allowed to stand under temperature atmosphere in the range of 20–800° C. and is subjected to a preliminary charge, an initial charge is carried out at an ordinary temperature. Thereby, lowering in the voltage of the battery is more difficult than the case of carrying out the initial charge at 20–80° C. immediately without the preliminary charging. In addition, there is brought about a sealed alkaline secondary battery which is excellent in utilization rate of the active material, discharge characteristics and capacity recovery rate.

Furthermore, the present invention is to provide a preferable one of the above-mentioned alkaline secondary batteries and it is characterized in that the preliminary charging is carried out with a quantity of electricity corresponding to 30% or more of such a quantity of electricity that is necessary for oxidizing cobalt hydroxide contained in the nickel electrode to become a trivalent state (CoOOH). In this case, it is preferable that the quantity of electricity for charging is carried out in the range of 30% 300% Thus, when the preliminary charge is so carried out that electric current of the quantity of electricity of 30% or more of the theoretical quantity of electricity which is required for oxidizing cobalt hydroxide (II) contained in the nickel electrode in the battery to become a trivalent state is applied thereto, the above-mentioned advantageous effects are brought about, and when the quantity of electricity is limited to 300%, the working efficiency is good and the foregoing alkaline secondary battery is obtained economically.

BEST MODE FOR CARRYING OUT THE INVENTION

Next, the modes for carrying out the present invention are explained in detail.

Any of cobalt salts of strong acids such as sulfuric acid, nitric acid, hydrochloric acid, etc., that is a strong acid cobalt salt selected from cobalt sulfate, cobalt nitrate, cobalt hydrochloride etc. is dissolved in water, and nickel hydroxide powder with or without a metal such as zinc, cobalt, etc., formed in a solid solution is dispersed in the acidic solution thereof, and a given amount of aqueous alkali solutions added gradually in the dispersed solution while the dispersed solution is being stirred vigorously. For example, it is added little by little so that the cobalt salt and the aqueous alkali solution may be made to react one with another gradually to precipitate cobalt hydroxide, and the reaction treatment is ended in such a condition that the final resulting reaction solution is kept in the range from an acidic region to a neutral region, typically, in the range of pH6–7. Whereupon, it has been found that the cobalt hydroxide thus obtained is, as will be made clear hereinafter, in such amorphous to microcrystal forms that is obviously different from the high crystalline cobalt hydroxide precipitated and separated from the conventional alkaline reaction solution, and is difficult to be oxidized and is high in reactivity with an alkaline electrolyte and is easy to form cobalt complex ions by charging.

In this case, as for the aqueous alkali solution, an aqueous dilute alkali solution is preferable. It is also possible to carry out the above-mentioned neutralization treatment by adding a small amount of a buffer such as an ammonium sulfate, an ammonium acetate, etc.

As the aqueous solution of dilute alkali, for example, 0.01–0.5M of sodium hydroxide, potassium hydroxide, lithium hydroxide, amimonia, etc. can be preferably used.

And the reaction solution after the completion of the reaction is kept in the region of acidity to neutrality. In the reaction solution, the active material of the positive electrode consisted of a mixture of a mass of nickel hydroxide particles and a mass of cobalt hydroxide $Co(OH)_2$ particles is obtained as a solid part. Next, by a solid-liquid separation, for example, by filtration, the active material of the positive electrode is separated out and washed with water thoroughly. The active material of the positive electrode thus obtained may be left as it is or may be made in a dried state. When it is dried, it is obtained as an active material of the positive electrode comprising a mixture powder in such a state that the cobalt hydroxide powders are mixed in the nickel hydroxide powders, in other words, in such a state that the cobalt hydroxide powders are mixed in the nickel hydroxide powders, and the nickel hydroxide powders are coated with the cobalt hydroxide powders.

Also, the present invention is to provide a paste-type nickel electrode which is improved in utilization rate of the active material, and is characterized in that it is provided with an active material of a positive electrode in which microcrystal or/and amorphous cobalt hydroxide is/are mixed in nickel hydroxide.

Next, an example of the method of production of this paste-type nickel electrode will be explained. For example, the active material of the positive electrode obtained by the method of producing the active material of the positive electrode according to the present invention is, as it is or after dried by heating, mixed and kneaded with a viscous solution in which a thickener such as CMC or the like is dissolved in water etc. to form a paste, and the active material paste thereof is filled in a three dimensional porous collecting substrate in the plate shape such as a foamed nickel substrate or the like, and is dried and pressed to obtain a paste-type nickel electrode. Thus, there is obtained the paste-type nickel electrode of the present invention in which the surfaces of innumerable active material particles of nickel hydroxide filled in an electrode plate which has innumerable micropores, are coated with the particles of amorphous to microcrystal cobalt hydroxide, in other words, in such a state that the cobalt hydroxide particles are interposed between the nickel hydroxide active material particles.

Using the above-mentioned paste-type nickel electrode of the present invention as a positive electrode, and a hydrogen-occlusion alloy electrode, cadmium electrode or the like as a negative electrode, those positive and negative electrodes are stacked one upon another with a separator interposed therebetween to form a plate group, and the plate group is put in a battery container and a given amount of alkaline electrolyte is poured therein and thereafter a cover is applied thereto and sealed to fabricate an alkaline secondary battery. It is preferable that this battery is allowed to stand at environmental temperatures of approximately 20–80° C. for a while. During this standing time, cobalt hydroxide in the nickel positive electrode dissolves in the alkaline electrolyte to form cobalt complex ion, $HCoO_2$. As the temperature is higher, the amount of dissolution and the amount of dispersion thereof into the nickel hydroxide active material particles are increased and the penetration thereof among the primary particles of nickel hydroxide or among the agglomerated secondary particles is increased, which is, therefore preferable.

Subsequently to this standing, if the initial electric charge to the battery is carried out under environmental temperatures of 20–80° C. in accordance with the rise in the electric potential of the nickel electrode, the formation of an electrically conductive network of electrically conductive cobalt oxyhydroxide (CoOOH) among the nickel hydroxide primary or secondary particles is obtained sufficiently and assuredly, so that there is obtained a nickel electrode, accordingly an alkaline secondary battery, which is excellent in discharge characteristics, utilization characteristics of the active material and capacity recovering characteristics.

Also, since the current collecting efficiency of the nickel electrode containing the cobalt hydroxide according to the present invention is increased, the content of cobalt compound used as a raw material can be decreased, and with this decreased amount, the content ratio of nickel hydroxide active material can be increased, so that the high capacity paste-type nickel electrode can be produced at a low cost.

Also, instead of raising the temperature especially to high temperatures of 30° C. or higher at the initial charge, after it is allowed to stand at environmental temperature in the range of 20 to 80° C. before the initial charge, a preliminary charge may be carried out. The preliminary charging is such a one that flows an electric current of a quantity of electricity ranging from 30% to more than that, preferably up to 300% of a theoretical electrical quantity which is required for oxidizing a divalent cobalt hydroxide $Co(OH)_2$ contained in the nickel electrode to become trivalent CoOOH state, and thereafter, when the initial charge is carried out at ordinary temperatures (20–25° C.), the oxidation corrosion of the negative electrode is not involved and even after it is allowed to stand under the condition that the internal pressure of the battery is remarkably low, decrease in the capacity is prevented, so that there can be produced an alkaline secondary battery which is improved in utilization rate of the active material to have a high capacity and also is excellent in capacity recovery characteristics after the preservation thereof.

Next, more specific examples will be explained together with comparative examples and conventional examples.
Preparation of an Active Material of a Positive Electrode

EXAMPLE 1

An aqueous solution of cobalt sulfate (pH5.11) was prepared by dissolving 200 g of cobalt sulfate heptahydrate in 500 ml of ion exchange water. This aqueous solution was put in a reaction tank which had a pH meter installed therein, and 300 g of commercial nickel hydroxide powder for use in batteries in the shape of a spheroidal or egg and contained 1.5% Co, 3% Zn formed into solid solutions was added thereto, and was stirred using a magnetic stirrer at 120 rpm, and 1000 ml of an aqueous solution of 0.44M sodium hydroxide was added dropwise at a flow rate of 10 ml/min via a buret to the dispersed solution of nickel hydroxide which was being stirred vigorously, so that the cobalt sulfate and the sodium hydroxide were made to react one with another to precipitate cobalt hydroxide, and this reaction was so carried out as to maintain the reaction solution in the region of acidity to neutrality. The pH of the reaction solution after the completion of the reaction was 6.9 in the neutral region. Next, the reaction solution in this neutral region was filtered, so that a solid part was separated from a filtrate. The color of the filtrate at this point was of a transparent light reddish brown color to indicate such a condition that the cobalt sulfate was still remained. After the separated solid part thus obtained was washed with water completely, it was dried at 100° C. for one hour. The powder obtained was of a dark blue-green color, and there was obtained a powder as a solid part, that is, the active material of the positive electrode according to the present invention which was consisted of a mixture of nickel hydroxide powder and cobalt hydroxide powder which would be described later. This will be referred as to the active material A for short, hereafter.

EXAMPLE 2

Except for that 500 ml of a 0.44M sodium hydroxide solution was used and the pH of the final reaction solution was 6.2 in the acidic region, the same manner as Example 1 was carried out, so that there was produced an active material of the positive electrode B which was consisted of a mixture of nickel hydroxide powder and cobalt hydroxide powder which would be described later. This will be referred as to the active material B for short, hereafter.

COMPARATIVE EXAMPLE 1

An aqueous solution of cobalt sulfate was prepared by dissolving 74 g of cobalt sulfate heptahydrate in 500 ml of ion exchange water. This aqueous solution was put in a reaction tank which had a pH meter installed therein, and 300 g of the same commercial nickel hydroxide powder for use in batteries as used in Example 1 was added thereto and stirred, and 100 ml of 0.44M sodium hydroxide solution was added dropwise at a flow rate of 10 ml/min via a buret to the dispersed solution of nickel hydroxide which was being stirred vigorously, so that there was carried out such a reaction that the cobalt sulfate and the sodium hydroxide were made to react one with another to precipitate cobalt hydroxide. While monitoring the pH meter, the supply of the sodium hydroxide was stopped when the reaction solution reached pH9 in the alkaline region. Next, this alkaline reaction solution was filtered, so that a solid part was separated from a filtrate. The color of the filtrate at this point was clear to indicate such a condition that all of the cobalt sulfate was converted into cobalt hydroxide. After the separated solid part thus obtained was washed with water completely, it was dried at 100° C. for one hour. The powder obtained was of a blue-green color, and there was obtained an active material of a positive electrode in which the cobalt hydroxide powder which would be described later was mixed in the nickel hydroxide powder. This will be referred as to the active material C for short, hereafter.

COMPARATIVE EXAMPLE 2

An aqueous solution of cobalt sulfate was prepared by dissolving 74 g of cobalt sulfate heptahydrate and 5 g of hydrazinium sulfate as a reducing agent in 500 ml of ion exchange water. This aqueous solution was put in a reaction tank which had a pH meter installed therein, and 300 g of the same nickel hydroxide powder for use in batteries as used in Example 1 was added thereto and stirred, and 1000 ml of the 1M sodium hydroxide solution was added dropwise at a flow rate of 10 ml/min via a buret to the dispersed solution of nickel hydroxide which was being stirred vigorously, so that there was carried out such a reaction that the cobalt sulfate and the sodium hydroxide were made to react one with another to precipitate cobalt hydroxide. While monitoring the pH meter, the supply of the sodium hydroxide was stopped when the reaction solution reached pH11.5 in the alkaline region. Next, the alkaline reaction solution was filtered, so that a solid part was separated from a filtrate. The color of the filtrate at this point was clear to indicate such a condition that all of the cobalt sulfate was converted into cobalt hydroxide. After the separated solid part was washed with water completely, it was dried at 100° C. for one hour. The powder thus obtained was of a light brown-green color, and there was obtained an active material of a positive electrode in which the cobalt hydroxide powder which would be described later was mixed in the nickel hydroxide and which was free from the reducing agent. This will be referred as to the active material D for short, hereafter.

COMPARATIVE EXAMPLE 3

100 g of the same nickel hydroxide powder for batteries as used in Example 1 was put in 500 ml of ion exchange water in a reaction tank, and while it was being heated at 60° C. and stirred, a 0.1M aqueous cobalt sulfate solution, a 0.2M ammonia solution and a 0.2M sodium hydroxide were added thereto at a flow rate of 1 ml/min. to be made to react one with another for several hours. After the completion of the reaction, the alkaline solution was filtered, and after the separated solid part was washed with water completely, it was dried at 80° C. for one hour, and there was obtained an active material of the positive electrode in which the cobalt hydroxide powder which would be described later was mixed in the nickel hydroxide coated with the cobalt hydroxide. This will be referred as to the active material E for short, hereafter.

COMPARATIVE EXAMPLE 4

After the active material E produced in Comparative Example 3 was put in a 30% aqueous solution of sodium hydroxide, it was heated to 80° C. and stirred for 6 hours while air was being blown thereinto to be made to react one with another. The reaction solution was of a brown color at the initial stage, but with the progress of the reaction, it was changed gradually into black in color. This reaction solution was filtered, and after the separated solid part was washed with water completely, it was dried at 80° C. for one hour, and there was obtained an active material used for the positive electrode composed of cobalt hydroxide powder. This would be referred as to the active material F for short, hereafter.

COMPARATIVE EXAMPLE 5

The same nickel hydroxide powder for batteries as that used in Example 1 was used as it was, as the active material of the positive electrode. This will be referred as to the active material G for short, hereafter.

As for the nickel hydroxides a–f in the above-mentioned active materials A–F which were obtained in Examples 1 and 2, and the Comparative examples 1–4, the quantitative analysis of cobalt by ICP was carried out in order to measure the amount of cobalt contained therein. Respective amounts of cobalts contained therein (excluding the amount of the component in the solid solution) are as shown in Table 1 below.

TABLE 1

| (Unit: %) | | | | | |
| --- | --- | --- | --- | --- | --- |
| A | B | C | D | E | F |
| 5.85 | 2.92 | 5.87 | 5.89 | 5.88 | 5.88 |

As it is clear from Table 1 above, it has been confirmed that the cobalt in the active material A obtained from Example 1 contains about the same amount of cobalt contained in the active materials D–F obtained from Comparative Examples 1–4, and that the cobalt in the active material B obtained from Example 2 is approximately half amount of the cobalt contained in the active materials A, C–F obtained in Example 1 and Comparative Examples 1–4.

Further, as for the above-mentioned active materials A–F, whether the tricobalt tetroxide was formed or not was examined using an X-ray diffraction device. As a result, in respect of the active materials A and B, any peaks were not observed in the X-ray diffraction patterns thereof. In contrast therewith, in respect of the active materials C–F, small peaks were observed therein, and thus formation of tricobalt tetroxide caused by the surface oxidization of the cobalt hydroxide was recognized. It has been confirmed from this that such cobalt hydroxides synthesized in the alkaline region as in Comparative Examples 1–4, is susceptible to be oxidized. It has been also found that, as shown in Comparative Example 3, even if it is synthesized under the presence of the reducing agent, as long as the cobalt hydroxide is synthesized in the alkaline region, after the solid part was washed with water to remove the reducing agent therefrom, the cobalt hydroxide in the active material D is susceptible to be oxidized.

The cobalt hydroxide synthesized in the alkaline region, like the case of Comparative Examples 1–4, is susceptible to be oxidized, but if the cobalt hydroxide is synthesized in the region of acidity to neutrality, like the case of Examples 1 and 2, it is difficult to be oxidized. In order to pursue the cause thereof, various comparisons and researches were carried out. It has been found that one of the causes is due to the difference in the crystal forms between both of the cobalt hydroxides as will be clarified by the comparison tests as mentioned below.

TEST EXAMPLE 1

Except for that the nickel hydroxide positive material used in the above-mentioned Example 1 was not used, the same manner as that in Example 1 was carried out and blue colored cobalt hydroxide powder A was obtained.

TEST EXAMPLE 2

Except for that the nickel hydroxide positive material used in the above-mentioned Comparative Example 1 was not used, the same manner as Example 1 was carried out and pink colored cobalt hydroxide powder D was obtained.

The X-ray diffraction measurement was carried out for each of the cobalt hydroxides A and D. The results thereof are shown in FIG. 1.

Also, thermal analyses [a differential thermal analysis (DTA) and a thermogravimetric analysis TGA] were carried out for each of the cobalt hydroxides A and D. The results thereof are shown in FIG. 2.

As shown in FIG. 1, the X-ray diffraction pattern of the cobalt hydroxide A is the pattern which is very broad and in which a low peak only appears around 2θ=33° and 37.5°, and is the diffraction pattern which is completely different from the X-ray diffraction pattern of α or β-type cobalt hydroxide which has such a high crystalline that has sharp diffraction peaks as disclosed in JP-A 62-234867, and it has been found that the cobalt hydroxide A is that having an amorphous or microcrystal form. In contrast therewith, it has been found that the diffraction pattern of the cobalt hydroxide D is a high-crystalline β-type cobalt hydroxide, β-Co(OH)$_2$.

On the other hand, as shown in FIG. 2, the result of the differential thermal analysis is that the DTA curve of the cobalt hydroxide A does not show any large chemical change up to 290° C. other than that it shows an endothermic peak representing removal of water contained in the particles thereof up to 120° C. In contrast therewith, the DTA curve of the cobalt hydroxide D shows a large and sharp peak near 140° C. On the other hand, the result of thermogravimetric analysis is that the TGA curve of the cobalt hydroxide A shows a decrease of weight thereof by approximately 11% up to 120° C. This represents that the cobalt hydroxide A has a large amount of water and that the water is removed. The TGA curve of the cobalt hydroxide D shows a decrease of weight thereof by 2.5% from near 140° C. that corresponds to its DTA curve. This represents the occurrence in the oxidation reaction which is accompanied by a thermal decomposition. It has been found therefrom that the cobalt hydroxide A is a substance which contains a large amount of water in the particles, and does not make the oxidation reaction up to near 300° C. and such a useful one that can be treated with high temperatures at a drying process, etc.

In addition, also as to the respective cobalt hydroxides obtained in the same manner as in Example 2 and Comparative Examples 2 and 3, except for that the nickel hydroxides used in Example 2 and Comparative Examples 2 and 3 were removed, there were obtained the same results as mentioned above.

Preparation of Paste-Type Nickel Electrodes

Using the above-mentioned active materials A–F, paste-type nickel electrode plates A–F were prepared respectively according to the ordinary method.

That is, as to each of the above-mentioned active materials A–F, it was added with 36 wt. parts of an aqueous solution of CMC based on 100 wt. parts thereof and was kneaded to prepare an active material paste of a positive electrode. Each of the active material pastes was filled in the foamed nickel substrate, and after being dried, it was pressed and cut to prepare each of paste-type nickel electrode plates A–F. The filled amount and the size of each electrode were made equal. The theoretical quantity of electricity for oxidizing all of cobalt hydroxide contained therein to cobalt oxyhydroxide is 120 mAh in the cases of the paste-type nickel electrode plates A,C,D,E and F, and 60 mAh in the case of the paste-type nickel electrode plate B.

On the other hand, as to the untreated active material, namely, the active material G in which the commercial nickel hydroxide powder itself was used as the active material of the positive electrode, it was added directly to cobalt hydroxide powder and to prepare a paste-type nickel electrode plate according to the ordinary conventional method as follows.

That is, there was added to a mixture of 90.9 wt. parts of the active material G and 9.1 wt. parts of a commercial cobalt hydroxide powder of guaranteed reagent, an 1% aqueous solution of CMC in the amount corresponding to 36% based on the mixture thereof, and they were kneaded to prepare an active material paste of a positive electrode. After this paste was filled in a foamed nickel substrate, it was dried, pressed, cut to prepare a paste-type nickel electrode plate G. The filled amount and the size of the electrode plate were made equal to those of the nickel electrode plates A–F. Further, as a result of analysis, it has been found that the ratio of cobalt, except the solid solution thereof, based on the whole raw material powder is 5.90%, and the theoretical quantity of electricity required for oxidizing cobalt hydroxide to cobalt oxyhydroxide is 120 mAh which is substantially the same as the paste-type nickel electrode plates A and C–F.

Fabrication and Production of Alkaline Secondary Batteries.

Next, using the above-mentioned paste-type nickel electrode plates A–G. respective alkaline secondary batteries were produced using the same producing method.

That is, using each of the above-mentioned paste-type nickel electrode plates A–G as a positive electrode, and using each hydrogen-occlusion electrode comprising commercial $AB_5$ type hydrogen-occlusion alloys, for instance, $MmNi_{3.2}Co_{1.0}Mn_{0.2}Al_{0.3}$ (Mm is misch metal) as a negative electrode, these positive and negative electrode plates were stacked one upon another with a hydrophilic made polyolefin nonwoven fabric separator interposed therebetween, and a plate group composed of the stacked layers was put in a battery container, and 1.98 cc of an alkaline electrolyte mainly composed of KOH with a specific gravity of 1.30 (KOH24%, NaOH5%, LiOH1%) was poured therein, and thereafter a cover was applied thereto immediately, and sealed to fabricate each of AA size sealed nickel-hydrogen batteries A–G which has a nominal capacity corresponding to 1200 mAh. The respective batteries will be referred as to the batteries A–G for short, hereafter.

As to the batteries A–G, after each thereof was allowed to stand at the ordinary temperature of 20° C., for 5 hours, an initial charge was carried out with 0.2C current so as to charge a quantity of electricity of 150% of the nominal capacity. Thereafter, it was allowed to stand at room temperature for one hour, and was then discharged with 0.2C current to 1V Next, charging 150% of the nominal capacity with 0.2C and discharging to the battery voltage 1V with 0.2C were repeated three cycles to achieve the initial activation, and the discharge capacity and the utilization rate of the nickel hydroxide were evaluated at the third cycle. The results thereof are shown in Table 2 below. The utilization rate of each of the nickel hydroxide active material in the nickel electrodes is found by setting a theoretical capacity at the time of reaction of one electron of the nickel hydroxide at 100%.

TABLE 2

|  | Discharge capacity (mAh) | Utilization rate of the nickel hydroxide (%) |
| --- | --- | --- |
| Battery A | 1346 | 199 |
| Battery B | 1282 | 110 |
| Battery C | 1279 | 113 |
| Battery D | 1233 | 109 |
| Battery E | 1154 | 102 |
| Battery F | 1245 | 110 |
| Battery G | 1222 | 108 |

Further, in order to measure the high-rate discharge characteristics of the batteries A–G, for each of the batteries A–G charging with 0.2C, 150% of the nominal capacity at 20° C., and discharging with 3C to the battery voltage 1V at each of the temperatures 20° C. and 0° C. were carried out. The results thereof are shown in Table 3 below. A capacity retention rate is the value found by setting the discharge capacity of each of the batteries A–G with 0.2C at 20° C. at 100%.

TABLE 3

| Capacity retention rate at the time of discharge with 3C (%) | | |
| --- | --- | --- |
|  | 20° C. | 0° C. |
| Battery A | 88 | 75 |
| Battery B | 83 | 72 |
| Battery C | 80 | 70 |
| Battery D | 75 | 50 |
| Battery E | 78 | 51 |
| Battery F | 74 | 45 |
| Battery G | 75 | 40 |

As it is clear from Table 3 above, as to the battery A in accordance with the present invention, a high discharge capacity and utilization rate of the active material were obtained as compared with the control batteries C–G which contain the same amount of cobalt. Also, as to the battery B in accordance with the present invention, although the amount of cobalt is less by half than the other control C–G, a relatively high discharge capacity was obtained in conjunction with that the content of the nickel hydroxide in large. As to the batteries C and D, the utilization rate were remarkably low compared with the battery A of the present invention containing the same amount of cobalt. It is considered that this is because the current collecting efficiencies of the nickel electrodes are lowered by formation of the non-electroconductive tricobalt tetroxide formed during and after the above-mentioned oxidization reaction treatment. As to the battery E, it is considered that since the reactivity between the cobalt hydroxide and the electrolyte is so low that the cobalt electric conductive matrix is not sufficiently formed, a low utilization rate is resulted. As to the battery F, it is considered that the utilization rate has become further low due to the tricobalt tetroxide etc. formed during the oxidization treatment. Also, as to the battery G, it is considered that since such a one that the cobalt hydroxide powder is added directly to the nickel hydroxide powder is used as the active material of the positive electrode, the electric conductivity among the nickel hydroxide particles is grown worse, and consequently, the discharge capacity and the utilization rate of the active material is further lowered. The addition amount of the cobalt hydroxide to the nickel hydroxide is in the range of 1 to 10%. When an economical point of view is considered, it has been found that the utilization rate is increased with the increase of the addition amount thereof in the range of 1 to 6%. It has been found that when more than that is added, the utilization rate is not improved more than that, and becomes almost constant and therefore it is uneconomical.

Also as it is clear from Table 3 above, also as to the high-rate discharge characteristics, the batteries A and B of the present invention which are good in growth of the cobalt electric conductive matrix exhibit a high capacity retention rate at either temperature of 20° C. or 0° C. as compared with the control batteries C–G. It is considered that this is because the paste-type nickel electrodes according to the present invention are excellent in the electric collecting efficiency, and a voltage drop caused by the polarization at the discharging time is small, so that the capacity which can be taken out until the final voltage is increased.

As to the batteries A and B, the battery A which is larger in the amount of the cobalt hydroxide which is interposed among the particles of the nickel hydroxide active material and coats the surfaces thereof shows such a tendency that is higher in utilization rate of nickel hydroxide and the capacity retention rate than the battery B. However, if the amount of the cobalt hydroxide is too large, the amount of the nickel hydroxide is decreased too much relatively, and therefore it is preferable that the amount of the cobalt hydroxide contained in the active material of the positive electrode is kept in a proper range. The proper range thereof is I to 10%. Also, as to the battery B although the amount of cobalt in the battery B is half of that in the conventional battery G, as shown in Table 2 and Table 3, it has been found that it is high in all of the discharge capacity, the utilization rate and the capacity retention rate for the small containing amount thereof. It has been found therefrom that the amount of cobalt can be decreased in order to obtain the capacity of the same level.

Influence of Standing and Initial Charge Temperatures

Next, for the batteries A–G, in order to examine the influence of standing and initial charge temperatures on the utilization rate of the active material, the internal pressure and the capacity recovery rate of each of the batteries, there were prepared such batteries that a pressure sensor was attached to each in the process of the above-mentioned fabrication of the batteries A–G. Thereafter, the same alkaline electrolyte as mentioned above was poured therein, and a cover was applied thereto and sealed. As to each of such batteries A–G, it was put in the respective thermostats which have different temperatures of 20, 30, 45, 60, 80 and 90° C., and they were allowed to stand under the respective temperature environments for five hours. Thereafter the initial charge for charging a quantity of electricity of 150% of the nominal capacity with 0.2C current was carried out. Thereafter as to each of the batteries A–G, 6 kinds of the batteries which were different in the initial charge temperatures were allowed to stand for one hour, and thereafter were discharged with 0.2C current to 1V. Next, for these batteries A–G, the initial activation was carried out by repetition of a charge-discharge cycle of charging of 150% of the nominal capacity with 0.2C and discharging with 0.2C to the battery voltage of 1V, and the discharge capacity and the utilization rate of the nickel hydroxide at the time of discharge of the third cycle were evaluated. The results thereof are shown in Table 4 below. The utilization rate of the nickel hydroxide of the nickel electrode is found by setting the theoretical capacity at the time of reaction of one electron of the nickel hydroxide at 100%.

TABLE 4

| | Utilization rate of nh (%) | | | | | |
|---|---|---|---|---|---|---|
| | 20° C. | 30° C. | 45° C. | 60° C. | 80° C. | 90° C. |
| Battery A | 119 | 120 | 124 | 124 | 123 | 123 |
| Battery B | 110 | 112 | 118 | 119 | 118 | 117 |
| Battery C | 113 | 114 | 115 | 116 | 115 | 115 |
| Battery D | 109 | 110 | 113 | 113 | 112 | 113 |
| Battery E | 102 | 108 | 116 | 116 | 115 | 115 |
| Battery F | 110 | 111 | 116 | 115 | 115 | 114 |
| Battery G | 108 | 115 | 110 | 110 | 111 | 109 |

Also, in order to measure the internal pressures of these batteries A–G, charging of 450% with 1C under the atmosphere of 20° C. was applied to each of the batteries A–G at the time of discharge of the fifth cycle of forgoing charge-discharge and the maximum internal pressure thereof was measured. The results thereof are shown in Table 5 below.

TABLE 5

| | Internal pressures of the batteries (kg f/cm2) | | | | | |
|---|---|---|---|---|---|---|
| | 20° C. | 30° C. | 45° C. | 60° C. | 80° C. | 90° C. |
| Battery A | 8 | 10 | 12 | 14 | 17 | 24 |
| Battery B | 8 | 10 | 11 | 13 | 17 | 25 |
| Battery C | 8 | 10 | 11 | 15 | 16 | 26 |
| Battery D | 9 | 11 | 12 | 16 | 18 | 24 |
| Battery E | 8 | 10 | 13 | 14 | 17 | 26 |
| Battery F | 8 | 10 | 12 | 14 | 18 | 25 |
| Battery G | 8 | 10 | 11 | 13 | 17 | 25 |

Also, in order to investigate the capacity recovery characteristics of these batteries A–G, the initial charge and the charge-discharge cycle were carried out in the same conditions as mentioned above, and the capacities of the batteries A–G at the third cycle were measured, and after these batteries were connected with 50 resistance for 24 hours under the atmosphere of 60° C., the charge-discharge was carried out at the same condition as mentioned above, and the capacities thereof were measured at the third cycle thereof, and the capacity ratio thereof at the above-mentioned third cycle was evaluated as the capacity recovery rate. The results thereof are shown in Table 6 below.

TABLE 6

Capacity recovery rate (%)

|  | 20° C. | 30° C. | 45° C. | 60° C. | 80° C. | 90° C. |
|---|---|---|---|---|---|---|
| Battery A | 91 | 93 | 98 | 98 | 99 | 99 |
| Battery B | 89 | 91 | 95 | 96 | 96 | 96 |
| Battery C | 87 | 89 | 93 | 94 | 95 | 95 |
| Battery D | 86 | 88 | 92 | 93 | 93 | 94 |
| Battery E | 85 | 88 | 93 | 94 | 95 | 95 |
| Battery F | 88 | 88 | 89 | 89 | 89 | 89 |
| Battery G | 85 | 89 | 95 | 96 | 96 | 96 |

As it is clear from Table 4, it has been found that, for the batteries A–G, the utilization rate of the active material shows such a tendency that as the temperature during the standing of the batteries and at the time of the initial charge is higher, it is increased generally, and it is not increased more than that above 60° C., and is saturated. It is considered that this is because, with the rise in temperature, the reaction between the coated cobalt hydroxide and the alkaline electrolyte, and the diffusion of the produced cobalt complex ions become smoother, so that the growth of cobalt electric conductive matrix formed between the nickel hydroxide particle becomes easier. Especially, the batteries A and B of the present invention are large in the rate of increase in the utilization rate of the active material from 30° C. to 40° C. as compared with the other batteries C–G. Also, the battery A is remarkably improved in the utilization rate of the active material in the initial charge temperatures from 20° C. to 90° C. as compared with the other batteries C–G. As for the battery B, although the content of the cobalt hydroxide is so less as the half of the other batteries, there is obtained such a result that the utilization rate thereof is about the same or larger than those of the batteries C–G in which the content of the cobalt hydroxide is approximately double. It is considered that this is because the battery A is the cobalt hydroxide which has a unique crystal form contained in the nickel electrode of B, high-order oxides thereof are not formed, its reaction with alkaline electrolyte is high and better formation of cobalt electric conductive matrix among the particles of the nickel hydroxide is made, as compared with such cobalt hydroxides contained in the nickel electrodes of the batteries C–G that are high in crystalline and partly formed into high-order oxides.

As it is clear from Table 5 above, the batteries A to G are all increased in the internal pressure of the batteries with the rise in the initial charge temperature, and increased suddenly especially above 90° C. It is considered that this is because the surfaces of the hydrogen-occlusion alloys of the negative electrodes are corroded at the time of the standing at 90° C. Accordingly, it has been found that the temperature during the standing time is preferable to be limited below 80 ° C.

As it is clear form Table 6 above, the capacity recovery rates of the batteries A–G are increased with the rise in temperature of the initial charge. It is considered that this is caused since the conversion efficiency of cobalt hydroxide into cobalt oxydydroxide is increased as the temperature rises, the amount of the cobalt oxyhydroxide is increased and the reactivity with the electrolyte and the resistance to reduction of the cobalt oxyhydroxide is increased. Also, especially as for the batteries A and B, it is considered that since the cobalt hydroxide contained in the nickel electrodes thereof is high in reactivity, as compared with the cobalt hydroxide contained in the nickel electrodes of the batteries C–G, they exhibit higher capacity recoverabilities.

Influence of standing and preliminary charge temperatures Next, in view of the results of the above-mentioned battery internal pressure examination, there was examined the battery characteristics of each of the above-mentioned batteries in a case where it was subjected to a preliminary charge after allowed to stand at temperatures of 20° C.–80° C. and was then subjected to the initial charge at the ordinary temperature, and there was obtained a good result in every case. Especially, the battery internal pressure could be suppressed as compared with a case where it was subjected to the initial charge at 20° C.–80° C. without being subjected to the preliminary charge. Examples thereof will be described in detail, hereafter.

That is, for the above-mentioned batteries A and B provided with the pressure sensors, after allowed to stand at a constant temperature chamber of 60° C. for five hours, each thereof was subjected to such preliminary charges for flowing with 0.2C current so as to charge the amounts of electric quantities corresponding to 20, 30, 100, 200, 300 and 400% of the theoretical electrical capacity required for oxidizing all of cobalt hydroxide in the nickel electrode to cobalt oxyhydroxide. Next, after each of the batteries of the foregoing respective temperatures was allowed to stand at room temperature (25±5° C.) for one hour, charging was resumed and the initial charge was carried out so as to become 150% of the nominal capacity of each battery. After each was allowed to stand in room temperature for 16 hours, the initial discharge with 0.2C was carried out. Next, the initial activation was carried out by repeating the charge-discharge cycle which consists of charging with 0.2C and 150% of the nominal capacity and discharging with 0.2C to the battery voltage of 1V, and the utilization rate of the nickel hydroxide was evaluated at the third cycle of the discharge. The results are shown in Table 7 below. The utilization rate of the nickel electrode is found by setting the theoretical capacity at the time of reaction of one electron of the nickel hydroxide at 100%.

Further, to measure the battery internal pressures of the batteries A and B at the time of the fifth cycle of the discharge in the foregoing charge-discharge cycles, they were subjected to the charging under an atmosphere of 20 with 1C and of 450%, and the maximum internal pressures at that point were measured. The results are shown in Table 8 below.

Furthermore, to investigate the capacity recoverabilities of the batteries A and B, the initial charge and the charge-discharge cycle thereof were carried out in the same condition as mentioned above, and the capacities of the batteries A and B at the third cycle thereof were measured. Next, after these batteries A and B were connected with 5Ω resistance for 24 hours under an atmosphere of 60° C., the charge-discharge was carried out in the same condition as mentioned above, and the capacities of the third cycle were measured, and thus the ratios of capacities at the third cycle were found as the capacity recovery rates. The results are shown in Table 9 below

TABLE 7

Utilization rate of nickel hydroxide (%)

Ratio of the charged amout at the preliminary charge (%)

|  | 20% | 30% | 100% | 200% | 300% | 400% |
|---|---|---|---|---|---|---|
| Battery A | 120 | 120 | 122 | 123 | 123 | 123 |
| Battery B | 111 | 114 | 116 | 118 | 119 | 119 |

TABLE 8

| | Battery internal pressure (kg f/cm²) | | | | | |
|---|---|---|---|---|---|---|
| | 20% | 30% | 100% | 200% | 300% | 400% |
| Battery A | 9 | 9 | 9 | 11 | 11 | 15 |
| Battery B | 9 | 9 | 9 | 10 | 11 | 15 |

TABLE 9

| | Capacity recovery rate (%) | | | | | |
|---|---|---|---|---|---|---|
| | 20% | 30% | 100% | 200% | 300% | 400% |
| Battery A | 92 | 95 | 97 | 98 | 99 | 99 |
| Battery B | 90 | 93 | 95 | 96 | 96 | 96 |

The utilization rate of the active material has, as shown in Table 7 above, such a tendency that it is increased as the ratio of the charged amount at the preliminary charge is increased. Since it reaches the saturation at 300%, the charged amount up to 300% is sufficient, and from a point of view of the electricity consumption and the work time, etc., it is preferable to be limited up to 300%.

Further, the battery internal pressure has, as shown in Table 8 above, such a tendency that it is increased as the charged amount at the preliminary charge is increased. In addition, as it is clear from the comparison thereof with the battery internal pressure at the time of the initial charging at 60° C. as shown in Table 5, in the case where the preliminary charge is carried out before the initial charge, the battery internal pressure after the initial charge can be suppressed remarkably low.

Further, the capacity recovery rate has, as shown in Table 9 above, such a tendency that it is increased as the ratio of the charged amount at the preliminary charge is increased. However, it has been found that since the capacity recovery rate is not improved at 300% or more, it is preferable to carry out in the ratios of the charged amounts up to 300% from the view points of the working efficiency and economy.

INDUSTRIAL APPLICABILITY

Thus, the present invention is, in the field of alkaline secondary batteries, useful as a method of producing an active material of a positive electrode thereof, a paste-type nickel electrode, an alkaline secondary battery and a method of producing thereof.

What is claimed is:

1. A method of producing an active material of a positive electrode used for an alkaline secondary battery comprising:

dispersing nickel hydroxide powder with or without a metallic element formed in solid solution in an aqueous solution of a strongly acidic cobalt salt selected from the group consisting of cobalt sulfate, cobalt nitrate and cobalt hydrochloride, gradually adding the dispersed solution, while being stirred, with an aqueous alkali solution, so that the cobalt salt and the aqueous alkali solution may be made to react one with another to precipitate cobalt hydroxide, separating an active material of a positive electrode in which a mass of the cobalt hydroxide particles is mixed in a mass of the nickel hydroxide particles from the reaction solution which is in the region of acidity to neutrality after the completion of the reaction, and then washing with water.

2. A paste-type nickel electrode produced according to the method of claim 1.

3. An alkaline secondary battery comprising a paste-type nickel electrode according to claim 2 used as a positive electrode, and a plate group constructed by stacking the paste type nickel electrode with a negative electrode one upon another with a separator interposed therebetween which is put in a battery container, and an alkaline electrolyte is poured therein, and a cover is applied to an opening thereof and sealed.

4. A method of producing an alkaline secondary battery characterized in that the alkaline secondary battery according to claim 3 is allowed to stand under temperature atmosphere in the range of 20–80° C., and is subjected to an initial charge.

5. A method of producing an alkaline secondary battery characterized in that after the alkaline battery according to claim 3 is allowed to stand under temperature atmosphere ranging 20–80° C. and is subjected to a preliminary charge, it is subjected to an initial charge at an ordinary temperature.

6. A method of producing an alkaline secondary battery according to claim 5, wherein it is characterized in that the preliminary charging is so carried out that charges a quantity of electricity corresponding to 30% or more of such a theoretical quantity of electricity that is necessary for oxidizing cobalt hydroxide contained in the nickel electrode to a trivalent state (CoOOH).

7. A method of producing an alkaline secondary battery wherein the quantity of electricity in the preliminary charging according to claim 6 is in the range of 30–300%.

\* \* \* \* \*